United States Patent Office 3,241,942
Patented Mar. 22, 1966

3,241,942
METHOD FOR COMBATING WEEDS
Henry Martin, Basel, and Hans Aebi, Riehen, Switzerland, assignors to Ciba Limited, Basel, Switzerland, a company of the Swiss confederation
No Drawing. Original application Nov. 20, 1961, Ser. No. 153,743. Divided and this application Mar. 20, 1963, Ser. No. 275,783
Claims priority, application Switzerland, Nov. 22, 1960, 13,072/60
The portion of the term of the patent subsequent to May 26, 1981, has been disclaimed
14 Claims. (Cl. 71—2.6)

This is a division of application Serial No. 153,743, filed November 20, 1961, now abandoned.

It is known that certain substituted ureas are suitable for controlling weeds. In recent years the use of N-phenyl-N':N'-dimethyl-ureas, which are substituted in the nucleus by chlorine atoms, have attracted attention as substances having a total herbicidal action, but these compounds do not possess a selective action.

This invention is based on the unexpected observation that new carbanilic acid derivatives of the general formula

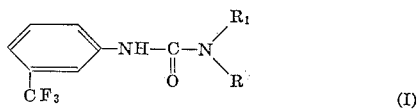

in which $R_1$ represents a hydrocarbon radical containing 1 or 2 carbon atoms, $R_2$ represents a hydrocarbon radical containing 2 to 4 carbon atoms, and $R_1$ and $R_2$ together contain not more than 5 carbon atoms, exhibit an excellent herbicidal action, and not only possess a total herbicidal action, but, when applied at suitable concentrations, are also very useful as selective herbicides.

Accordingly, the present invention provides compounds of the above Formula I, and also herbicidal preparations, which comprise such a compound in admixture with a solvent, a non-solvent liquid diluent or a solid diluent. The preparations may also contain a dispersing agent, an adhesive, a fertilizer or another pest controlling agent.

The following compounds of the above Formula I possess particularly favourable properties as herbicides:

N-3-trifluoromethylphenyl-N':N'-diethyl-urea,
N-3-trifluoromethylphenyl-N'-methyl-N'-n-butyl-urea,
N-3-trifluoromethylphenyl-N'-methyl-N'-ethyl-urea,
N-3-trifluoromethylphenyl-N'-methyl-N'-n-propyl-urea,
N-3-trifluoromethylphenyl-N'-methyl-N'-isopropylurea and
N-3-trifluoromethylphenyl-N'-methyl-N'-allyl-urea.

The compounds of the general Formula I can be made by methods in themselves known. Generally speaking, all the usual methods for making urea derivatives, including the methods customarily used on a commercial scale, are suitable. A few methods are described below by way of illustration, but it is not intended to give a complete enumeration. In the following formulae Ar represents the phenyl radical containing a trifluoromethyl group in the general Formula I, and the methyl group is chosen for $R_1$ and the ethyl group for $R_2$.

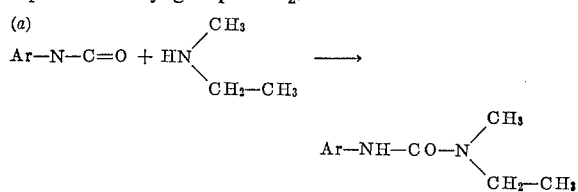

Instead of the isocyanate, a compound capable of forming or splitting into the isocyanate may be used.

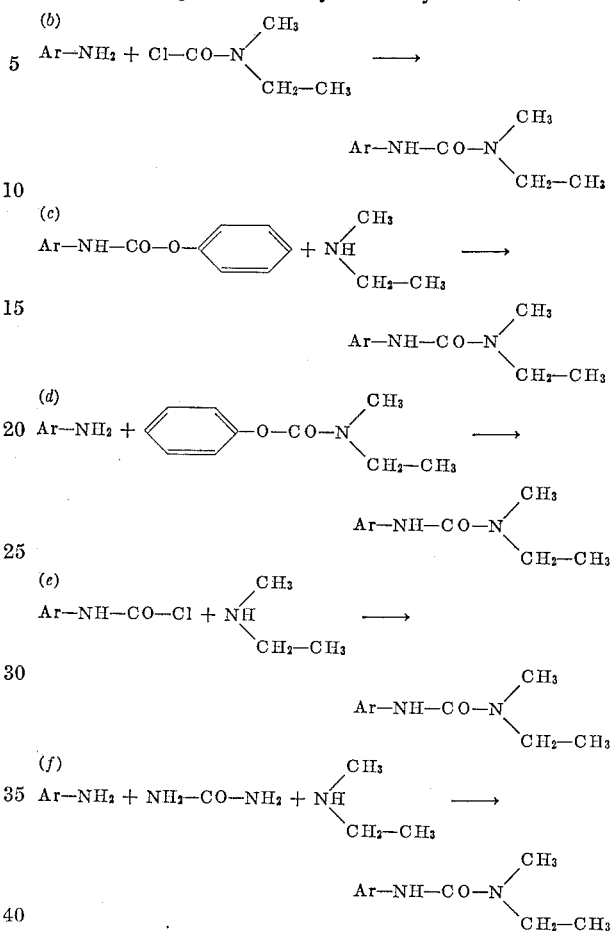

As aliphatic amines for reaction with the aromatic isocyanate there may be mentioned, for example, methylethylamine, methylpropylamine, methylbutylamine, and diethylamine.

Thus, for example, to make N-3-trifluoromethylphenyl-N':N'-diethyl-urea, 3-trifluoromethylphenyl isocyanate is reacted with diethylamine.

The active substances of the general Formula I may be made up into herbicidal preparations in which they are in an emulsified or dispersed or dissolved form or incorporated with a dusting agent, the active substance being present alone or together with another herbicide, for example, tri- and tetra-substituted arylalkyl-ureas, halogenated phenoxy-alkane carboxylic acids, halogenated benzoic acids or phenyl-acetic acids, halogenated fatty acids or salts, esters or amides thereof, or together with halogenated benzonitriles, halogenated terephthalic acid esters or halogenated methacrylic acid anilides, borax or other inorganic salts, such as abraum salts, or with calcium cyanamide, urea and other fertilizers, or with pest controlling agents, for example, chlorinated hydrocarbons or phosphoric acid esters. Active substances having a basic action, such as certain tertiary or quaternary amines having a herbicidal action, may also be incorporated in the preparations, for example, dodecylhexamethylene imine or salts thereof, 1:1'-ethylene-2:2'-dipyridilium dibromide or salts thereof. Herbicidally active carbamates, thiol-carbamates or dithiocarbamic acid esters or derivatives of s-triazine may also be incorporated in the preparations. Certain heterocyclic compounds having a herbicidal action, for example, 2-chlorobenzothiazole, 3-amino-1:2:4-triazole, maleic acid hydrazide or 3:5-dimethyl-tetrahydro-1:3:5-thiadiazine-2-thione, or simpler herbicidal substances, such as pentachlorophenol, dinitrocresol, dinitrobutylphenol, naphthylphthalamic acid or methyl isothiocyanate, may also be used.

Spraying liquors containing the active substances can be prepared, for example, with mineral oil fractions of high to medium boiling range, such as diesel oil or kerosene, or with coal tar oils or oils of vegetable or animal origin, or with hydrocarbons, such as alkylated naphthalenes, tetrahydronaphthalene, if desired, with the use of xylene mixture, cyclohexanols or ketones, or chlorinated hydrocarbons, such as tetrachlorethane, trichorethylene or tri- or tetra-chlorobenzenes.

The preparations may be made up as emulsion concentrates, pastes or wettable powders, which are brought into an aqueous form ready for use by dilution with water. As emulsifying or dispersing agent there may be mentioned quaternary ammonium compounds, soaps, soft soaps, aliphatic sulfuric acid ester salts, aliphatic-aromatic sulfonic acid salts, alkoxyacetic acids, polyglycol ethers of fatty alcohols and polyethylene oxide condensation products.

To prepare strewing or dusting preparations, talcum, kaolin, bentonite, calcium carbonate, calcium phosphate, charcoal, cork powder, wood flour or other materials of vegetable origin may be used as solid diluents. The herbicidal preparations may also contain the usual additions which improve the distribution, adhesiveness, resistance to rain or penetrating powder. As such substances there may be mentioned fatty acids, resins, glue, casein or, for example, alginates and other substances.

The new herbicidal preparations may contain the active substance in concentrated form, for example, they may contain 5 to 80 percent by weight of the active substance. In many cases, before the agent is used for controlling weeds, the concentrated preparation is suitably diluted, for example, to a content of active substance of 0.5 to 5 percent by weight. The preparations of the invention may also be made up initially in so diluted a form that further dilution before use for controlling weeds is unnecessary.

Depending on the amount of the carbamic acid amide present in the preparations they can be made suitable for selectively killing weeds among crop plants, for example, when applied at the rate of 2 to 6 kg. of active substance per hectare, or for totally killing and destroying undesirable vegetation. As "weeds" there are also included undesirable cultivated plants, i.e. cultivated plants grown previously or in the vicinity.

The following examples, illustrate the invention:

*Example 1*

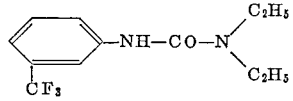

187 grams of 3-trifluoromethylphenyl isocyanate were dissolved in 150 cc. of acetone, and the solution was run into 81 grams of diethylamine in 1000 cc. of water. The condensation product initially precipitated in a semi-solid form and as stirring was continued it gradually became granular. The precipitate was then filtered off with suction, washed with water and dried in vacuo. The yield of the crude product was 247 grams and it melted at 72–78° C. By recrystallization from hexane, pure N-3-trifluoromethylphenyl - N':N'-diethyl-urea was obtained melting at 83–84° C.

$C_{12}H_{15}ON_2F_3$.—Calculated: N, 10.76%. Found: N, 10.81%.

*Example 2*

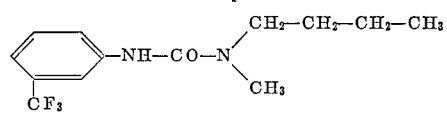

187 grams of 3-trifluoromethylphenyl isocyanate were dissolved in 150 cc. of acetone or acetonitrile, and the solution was added, while cooling slightly and stirring vigorously, to 100 grams of N-methylbutylamine dissolved in 1000 cc. of water. The condensation product precipitated. Stirring was continued for a few hours longer, the precipitated product becoming solid. The precipitate was then filtered off with suction, washed and dried in vacuo at 45° C. 188 grams of the crude product melting at 85–86° C. were obtained. By recrystallization from alcohol, pure N-3-trifluoromethylphenyl-N'-methyl-N'-n-butyl-urea, melting at 88–89° C. was obtained.

The following compounds were obtained in the same manner:

N - 3 - trifluoromethylphenyl-N'-methyl-N'-ethyl-urea (from N-3-trifluoromethylphenyl isocyanate and methylethylamine), N-3-trifluoromethylphenyl-N'-methyl-N'-n-propyl-urea (from N-3-trifluoromethylphenyl isocyanate and methyl-n-propylamine), N-3-trifluoromethylphenyl-N'-methyl-N'-isopropyl-urea (from N-3-trifluoromethylphenyl isocyanate and methylisopropylamine) and N-3-trifluoromethylphenyl-N'-methyl-N'-allyl-urea (from N-3-trifluoromethylphenyl isocyanate and methylallylamine).

*Example 3*

10 grams each of N-3-trifluoromethylphenyl-N':N'-diethyl-urea and N-3-trifluoromethylphenyl-N'-methyl-N'-n-butyl-urea, obtained as described in Examples 1 and 2, respectively, were mixed separately with 2 grams of sulfite cellulose waste liquor and made up to 100 ml. with water. Each mixture was subjected to intensive grinding, whereby two finely divided stable dispersions were obtained.

*Example 4*

Flower pots were filled with earth in a greenhouse and seeds of the following plants were sown therein: *Avena sativa, Setaria italica, Dactylis glomerata, Sinapis alba, Calendula chrysantha* and *Lepidium sativum*. The earth was watered, and, on the day after sowing, two spraying liquors prepared with the two dispersions obtained as described in Example 3 were separately sprayed. The concentration of the active substance in each spraying liquor was 0.64%. Three weeks after treatment, all the test plants were completely or almost completely killed, with the exception of *Avena sativa*, which were heavily damaged. This result was obtained with each of the spraying liquors.

*Example 5*

Flower pots were prepared in a mannner similar to that described in Example 4. 14 days after sowing, the plants were treated with the same spraying liquors as those used in Example 4. 14 days after application all the test plants were dead, with the exception of *Avena sativa*. This result was obtained with each of the spraying liquors.

*Example 6*

40 parts of each of the compounds obtained as described in Examples 1 and 2 were separately mixed with 58 parts of kaolin and 2 parts of the emulsifier "Toximul MP" (brand name) supplied by Ninol Inc. Chicago which consists of a mixture of anion-active and non-ionic organic compounds having a surface-active action, and each mixture was finely ground. The mixtures are useful as wettable powders which can be diluted with any desired proportion of water, for example, a proportion such as to give a concentration of 0.5% of active substance.

*Example 7*

This example illustrates the use of herbicidal compounds of the invention in small amounts to obtain selective herbicidal effects.

A field, which had been cleared of all annual weeds before the test, was sown with the following weeds and crop plants:

*Zea mays, Sorghum sudanense, Setaria italica, Triticum vulgare, Avena sativa, Allium cepa, Pisum sativum, Linum usitatissimum, Phaseolus vulgaris, Soja max, Cannabis sativa, Daucus carota, Spinacia oleracea, Trifolium pratense, Trifolium repens, Brassica rapa, Sinapis alba, Raphanus raphanistrum, Beta vulgaris, Lactuca sativa.*

On the day after sowing, the field was treated with a spraying liquor prepared from the wettable powder described in Example 6, which contains N-3-trifluoromethylphenyl-N'-N'-diethyl-urea, the active substance being applied at the rate of 2.5 kg. per hectare. 6 weeks after treatment, the degree of damage to all the test plants was assessed according to a scale of values from 0 to 10; 0 denoting a completely normal plant, and 10 denoting complete destruction. The degrees of damage to the individual plants in the same sequence as above, were as follows:

2, 0, 4, 9, 10, 0, 1, 3, 0, 2, 7, 1, 10, 10, 10, 9, 2, 9, 10, 10.

*Example 8*

(a) The compounds prepared as described in Examples 1 and 2 were each made up into a mixture having the following composition:

50 parts of active substance
45 parts of kaolin
5 parts of a dispersing agent consisting of 3 parts dodecyl sulfonate and 2 parts of a condensation product of dodecyl alcohol with 8 mols of ethylene oxide.

---

100 parts

After being finely ground the resulting mixtures are wettable powders that are miscible with water in all proportions.

Instead of kaolin, another filler customarily used in herbicides, for instance, talcum, may be used.

Instead of the dispersing agent given above, another dispersing agent may also be used, preferably one consisting of at least 1 part, for example 3 parts of an anion-active organic substance and 1 part of a non-ionic surface-active organic substance.

The wettable powders so obtained are referred to hereinafter as "Mixture 1" (containing N-3-trifluoromethylphenyl-N':N'-diethyl-urea) and "Mixture 2" (containing N-3-trifluoromethylphenyl - N'-methyl-N'-n-butyl-urea), respectively. Each mixture was used in the form of an aqueous spraying liquor, which, for example, for application at the rate of 6 kg. per hectare, contained 0.6 percent by weight of active substance.

(b) A field was planted with *Allium porrum* and divided into parcels. 14 days after planting, some of the parcels were sprayed with Mixture 1 and others with Mixture 2 at the rate of 6 kg. of active substance per hectare, and further parcels were left untreated as controls. 25 days after spraying the result was inspected and it was found that the untreated parcels were completely overgrown with weeds, and the result for the treated parcels were as follows:

| Weeds | Action on weeds in percent | |
|---|---|---|
| | Mixture 1 | Mixture 2 |
| Stellaria media | 100 | 100 |
| Galinsoga parviflora | 100 | 100 |
| Urtica urens | 100 | 90 |
| Sonchus oleracea | 100 | Not present |
| Poa annua | Inhibited | 90 |

The development of *Allium porrum* was in no way impaired by the application of Mixtures 1 and 2.

(c) A field was sown with carrots (*Daucus carota*) and sprayed 19 days afterwards with Mixture 1 at the rate of 6 kg. of active substance per hectare. At the time of treatment, the weeds had developed six to ten leaves. 15 days after treatment, the carrots in the untreated parcels had practically died off owing to the soil being heavily overgrown with weeds, whereas they developed completely normally in the treated parcels. The effect of Mixture 1 was found to be as follows:

Weeds: Action in percent

Galinsoga parviflora _____ 90
Urtica urens _____ 100
Stellaria media (strongly inhibited) _____ 80
Capsella bursa pastoris _____ 100
Sonchus cleracea _____ 100
Portulaca oleracea _____ Inhibited (d) A field overgrown with weeds consisting mainly of *Stellaria media* and *Galinsoga parviflora* was planted with tomatoes and sprayed 13 days later with Mixture 2 at the rate of 6 kg. of active substance per hectare. 14 days after spraying, the treated parcels were entirely free from weeds, while the aforesaid weeds completely covered the untreated parcels. The tomatoes were not damaged by the treatment.

(e) A field was planted with celery and sprayed 12 days later with Mixture 1 at the rate of 2 kg. of active substance per hectare, or with Mixture 2 at the rate of 6 kg. of active substance per hectare. N-3:4-dichlorophenyl-N':N'-dimethyl-urea was used for comparison at the rates of 0.25 and 0.5 kg. of active substance per hectare. The effect on weeds and cultivated plants was assessed 34 days after treatment. Whereas the celery plants had developed completely normally in the parcels treated with Mixtures 1 and 2, the celery plants in the parcels treated with the product used for comparison had had their development distinctly checked, showed chlorosis at the leaf edges, and some were completely dead. In spite of the celery plants being protected, an excellent result was obtained against the weeds by means of Mixtures 1 and 2.

In particular, the following weeds were killed:

*Stellaria media, Galinsoga paravifloro, Urtica urens, Sonchus oleracea, Capsella bursa pastoris, Senecio vulgaris* and *Lanium purpureum.*

What is claimed is:

1. The method for selectively combating weeds growing beneath maize which comprises applying to the area where the said effect is desired, a weed-killing amount of a compound of the formula

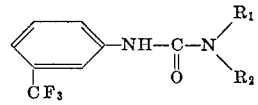

in which $R_1$ represents an alkyl radical containing at most 2 carbon atoms, $R_2$ represents an alkyl radical containing 2 to 4 carbon atoms and $R_1$ and $R_2$ together contain no more than 5 carbon atoms.

2. A method as claimed in claim 1, wherein the active principle is applied in an amount of 2.5 kgs./hectare.

3. The method for selectively combating weeds growing beneath a member selected from the gorup consisting of beans and soya beans which comprises applying to the area where the said effect is desired, a weed-killing amount of a compound of the formula

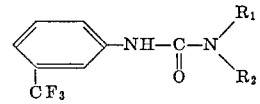

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

4. A method as claimed in claim 3, wherein the active principle is applied in an amount of 2.5 kgs./hectare.

5. The method for selectively combating weeds growing beneath onions which comprises applying to the area where the said effect is desired, a weed-killing amount of a compound of the formula

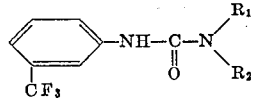

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

6. A method as claimed in claim 5, wherein the active principle is applied in an amount of 2.5 kgs./hectare.

7. The method for selectively combating weeds growing beneath carrots which comprises applying to the area where the said effect is desired, a weed-killing amount of a compound of the formula

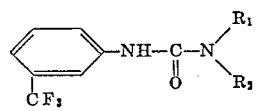

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

8. A method as claimed in claim 7, wherein the active principle is applied in an amount of 2.5 kgs./hectare.

9. The method for selectively combating weeds growing beneath tomatoes which comprises applying to the area where the said effect is desired, a weed-killing amount of a compound of the formula

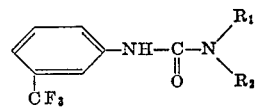

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

10. A method as claimed in claim 9, wherein the active principle is applied in an amount of 6 kgs./hectare.

11. The method for selectively combating weeds growing beneath celery which comprises applying to the area where the said effect is desired, a weed-killing amount of a compound of the formula

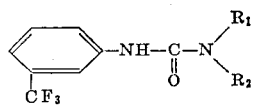

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

12. A method as claimed in claim 11, wherein the active principle is applied in an amount of 2 to 6 kgs./hectare.

13. The method for selectively combating weeds growing beneath leeks which comprises applying to the area where the said effect is desired, a weed-killing amount of a compound of the formula

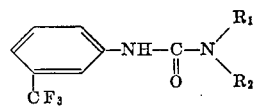

in which $R_1$ represents an alkyl radical containing at most 2 carbon atoms, $R_2$ represents an alkyl radical containing 2 to 4 carbon atoms and $R_1$ and $R_2$ together contain not more than 5 carbon atoms.

14. A method as claimed in claim 13, wherein the active principle is applied in an amount of 6 kgs./hectare.

References Cited by the Examiner

UNITED STATES PATENTS 2,705,195   3/1955   Cupery et al. _____ 71—2.6
3,134,665   5/1964   Martin et al. _____ 71—2.6

OTHER REFERENCES

Abel: Chemistry and Industry, Aug. 17, 1957, pages 1106 to 1112.

LEWIS GOTTS, *Primary Examiner.*

JULIAN S. LEVITT, *Examiner.*

JAMES O. THOMAS, Jr., *Assistant Examiner.*